(12) United States Patent
Santin Navarro et al.

(10) Patent No.: US 11,498,510 B2
(45) Date of Patent: Nov. 15, 2022

(54) AIRBAG UNIT, MORE PARTICULARLY HEAD SIDE AIRBAG

(71) Applicant: Dalphi Metal Espana, S.A., Vigo (ES)

(72) Inventors: Pedro José Santin Navarro, Vigo (ES); Estér Sanchez Rodriguez, Gondomar (ES)

(73) Assignee: DALPHI METAL ESPANA S.A., Vigo (ES)

( * ) Notice: Subject to any disclaimer, the term of this patent is extended or adjusted under 35 U.S.C. 154(b) by 0 days.

(21) Appl. No.: 17/251,849

(22) PCT Filed: Jun. 18, 2019

(86) PCT No.: PCT/EP2019/065969
§ 371 (c)(1),
(2) Date: Dec. 14, 2020

(87) PCT Pub. No.: WO2019/243304
PCT Pub. Date: Dec. 26, 2019

(65) Prior Publication Data
US 2021/0253057 A1    Aug. 19, 2021

(30) Foreign Application Priority Data
Jun. 22, 2018    (DE) .......................... 102018115062.8

(51) Int. Cl.
*B60R 21/2165*    (2011.01)
*B60R 21/231*    (2011.01)
*B60R 21/232*    (2011.01)

(52) U.S. Cl.
CPC ........ *B60R 21/2165* (2013.01); *B60R 21/232* (2013.01); *B60R 21/23138* (2013.01)

(58) Field of Classification Search
CPC . B60R 21/2342; B60R 21/213; B60R 21/214; B60R 21/20; B60R 21/2165; B60R 21/237; B60R 21/232
See application file for complete search history.

(56) References Cited

U.S. PATENT DOCUMENTS 6,145,879 A * 11/2000 Lowe ...................... B60R 21/20
                                                          280/743.1
7,357,408 B2 * 4/2008 Hall ....................... B60R 21/213
                                                          280/728.2

(Continued)

FOREIGN PATENT DOCUMENTS

| DE | 202004004020 | 7/2004 |
| JP | 2016145011 | 8/2016 |
| WO | 2012072260 | 6/2012 |

OTHER PUBLICATIONS

English machine-translation of DE 2020 04004020 to TRW Automotive GMBH (Year: 2020).*

*Primary Examiner* — Paul N Dickson
*Assistant Examiner* — Tiffany L Webb
(74) *Attorney, Agent, or Firm* — Tarolli, Sundheim, Covell & Tummino LLP

(57) ABSTRACT

An airbag unit comprising an airbag (22) folded or rolled into an elongate package as well as a wrapping (28) holding the package in the folded state includes a fold-back longitudinal end (36) of the package. Apart from a first tearing line (32) through which the airbag (22) leaves the wrapping (28), in the area of the bending point (38) the wrapping (28) has a second tearing line (50) which provides for better gas flow to the fold-back package portion (40).

16 Claims, 2 Drawing Sheets

(56) References Cited

U.S. PATENT DOCUMENTS

| | | | |
|---|---|---|---|
| 7,380,815 B2* | 6/2008 | Rose | B60R 21/213 |
| | | | 280/728.2 |
| 7,614,646 B2* | 11/2009 | Hill | B60R 21/201 |
| | | | 280/728.2 |
| 8,414,020 B2* | 4/2013 | Beppu | B60R 21/2334 |
| | | | 280/730.2 |
| 9,278,661 B2* | 3/2016 | Jovicevic | B60R 21/213 |
| 10,131,313 B2* | 11/2018 | Young | B60R 21/201 |
| 10,272,867 B2* | 4/2019 | Santin Navarro | B60R 21/213 |
| 10,654,438 B2* | 5/2020 | Iwata | B60R 21/214 |
| 2001/0036892 A1 | 11/2001 | Kleeberger et al. | |
| 2002/0163169 A1* | 11/2002 | Fischer | B60R 21/213 |
| | | | 280/730.2 |
| 2005/0082798 A1 | 4/2005 | Tallerico et al. | |
| 2008/0136143 A1 | 6/2008 | Boxey | |
| 2009/0102169 A1 | 4/2009 | Gloeckler et al. | |
| 2011/0127755 A1 | 6/2011 | Beppu et al. | |
| 2015/0115575 A1 | 4/2015 | Jovicevic | |

\* cited by examiner

AIRBAG UNIT, MORE PARTICULARLY HEAD SIDE AIRBAG

RELATED APPLICATIONS

This application corresponds to PCT/EP2019/065969, filed Jun. 18, 2019, which claims the benefit of German Application No. 10 2018 115 062.8, filed Jun. 22, 2018, the subject matter of which are incorporated herein by reference in their entirety.

BACKGROUND OF THE INVENTION

The invention relates to an airbag unit, especially a head side airbag unit, comprising an airbag folded or rolled into an elongate package as well as a wrapping holding the package in the folded state.

Said airbag units are installed in vehicles as so-called curtain-like head side airbag units. Said head airbag units in the inflated state cover at least a large part of a side window or of the side windows of the front occupant and of the rear occupant sitting behind in a row. The airbags protect against a side impact and are folded or rolled lengthwise, i.e. the package has longitudinal folds or a roll axis extending in parallel to the longitudinal direction of the airbag. In other words, the length of the package corresponds to the length of the spread airbag, measured in the longitudinal vehicle direction (related to the mounted state). Usually said airbag units are installed along the roof rail above the side windows and, where necessary, also along one or two vehicle pillars beneath a lining. The wrapping holds the airbag in its folded or rolled state, thus facilitating assembly.

However, there are particular mounting situations in which the package is difficult to be mounted in an elongate form, i.e. in its stretched length, e.g. because there is little space provided in the area of a vehicle pillar. In that case, according to the invention said longitudinal end of the package including the wrapping surrounding the package which surrounds the package like a sausage casing is folded back in U-shape at a bending point. When the wrapping tears due to the internal pressure within the airbag in the case of release, the fold-back airbag portion turns back to its home position, i.e. its non-bent position, and covers an additional portion of the vehicle so as to offer safety even in this area.

What is important for quickly deploying and returning the airbag in the area of the fold-back end is a rapid gas flow through the interior of the package into said fold-back package portion. Usually this is impeded by the fact that the fold-back package portion is fastened at least temporarily via fasteners to the remaining airbag unit. It is the object of the invention to provide an airbag unit which can be mounted in a more variable manner.

This is achieved in an airbag unit of the aforementioned type in that a longitudinal end of the package including the surrounding flexible wrapping is folded back at a bending point while forming a U-shape, wherein said U-shape is formed by a fold-back portion of the airbag unit with a fold-back package portion and the surrounding wrapping as well as a remaining airbag unit, and wherein the wrapping has a given first tearing line which extends over the length of the airbag unit and via which the airbag leaves the wrapping during deployment, the wrapping having an additional given second tearing line in the area of the bending point.

In previous elongate airbag units, the wrappings included only one tearing line which usually extended over the total length of the airbag package. The invention provides another tear line that provides weakening in the area of the bending point. Said weakening may help to widen the airbag more easily in the area of the bending point, for the wrapping opens more easily than in the state of the art. The flow passage forming for the inflowing gas in the interior of the not yet or hardly deployed airbag may be increased in the area of the bending point already in the initial state of the inflating operation so that gas may flow into the fold-back package portion more quickly than before, which results in rapid deployment thereof and in tearing of the first tearing line.

The second tearing line preferably extends on wall portions of the wrapping facing each other. By folding back the longitudinal end of the package two portions of the wrapping are adjacent to each other or are juxtaposed, and in said wall portions facing each other then the second tearing line is provided.

The second tearing line should extend in the direction of longitudinal extension of the package, especially exclusively in the direction of longitudinal extension of the package, i.e. along the folding lines or along the roll axis. This provides for even quicker tearing behavior.

The second tearing line moreover may be circumferentially spaced apart from the first tearing line over its entire length. This ensures the wrapping to be opened at the first and second tearing lines independently of each other.

The second tearing line should extend over at least 60%, especially over at least 75% of the length of the fold-back package portion so as to allow for a gas flow up to the longitudinal end of the airbag.

Furthermore, it is of advantage when the second tearing line extends from the bending point over the same length along the portions of the wrapping starting from the bending point. In this way it is to be achieved that on one side the deploying airbag can peel the wrapping further off at one package portion in the area of the second tearing line than at the other package portion.

In order to enable the airbag to leave the airbag at the first tearing line over the entire length thereof and to spread downwards in the direction of the vehicle bottom, the second tearing line should extend starting from the bending point only over a partial length of the fold-back wrapping, i.e. not over the entire wrapping. This is to ensure that the end of the airbag leaves the wrapping at the first tearing line and not completely at the second tearing line only.

The airbag unit according to the invention may also comprise an inflator which is fluid-coupled to the airbag at the central third of the longitudinal extension of the folded airbag unit. The inflator then generates gas which spreads from said central third preferably in opposite directions forwards and backwards.

There may be provided a fastener by which the fold-back portion of the airbag unit is fastened to the remaining airbag unit or, more generally, is fixed relative to the remaining airbag unit. Here, for example, a type of strip or clamp may be provided which is then fastened to the vehicle. It is an alternative option that the fold-back portion of the wrapping is fastened to the remaining portion of the wrapping. The mounting position is defined within narrow limits by the fastener.

SUMMARY OF THE INVENTION

The airbag of the airbag unit according to the invention especially is a curtain-like head side airbag for covering at least part of a side window of a dedicated vehicle, especially a joint airbag for front and rear occupants, i.e. the airbag extends over the dedicated side windows of the front and rear passengers.

The wrapping in particular is a flexible tube made from e.g. textile material, wherein the wrapping may be manufactured e.g. by being laid around the package and then being stitched up.

The first and/or second tearing line(s) may be a perforation of the wrapping or a tear seam in the wrapping.

In order to render the time succession of opening operations of the wrapping predeterminable, the wrapping is preferably less stable at the second tearing line than at the first tearing line at least in the portion extending next to the second tearing line. Thus, the wrapping breaks at the second tearing line ahead of the portion of the first tearing line extending next to the second tearing line, viz. extending within the same longitudinal portion as the first tearing line.

BRIEF DESCRIPTION OF THE DRAWINGS

Further features and advantages of the invention will be evident from the following description of the enclosed drawings which will be referred to and wherein.

DESCRIPTION

Figure 1:
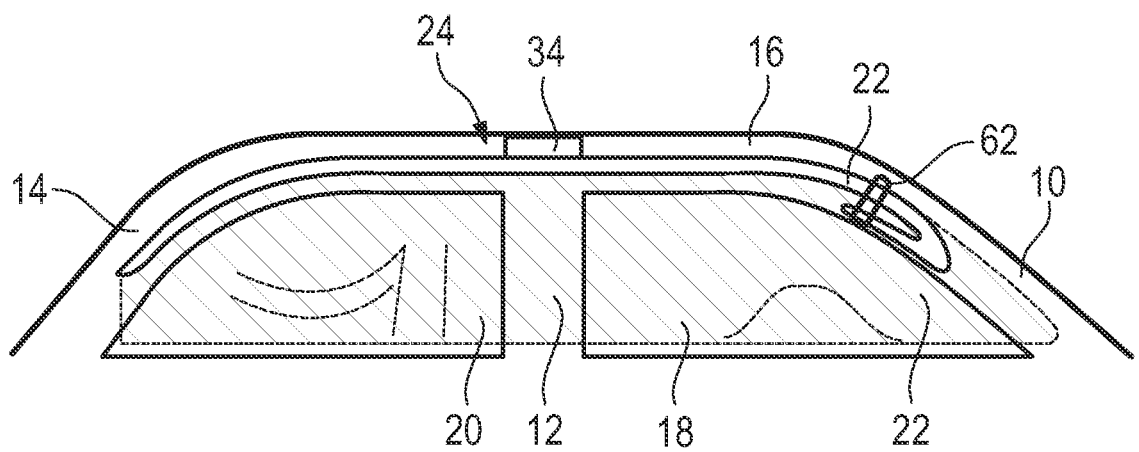
FIG. 1 shows a schematic side view of a vehicle interior comprising an installed airbag unit according to the invention.
Figure 2:
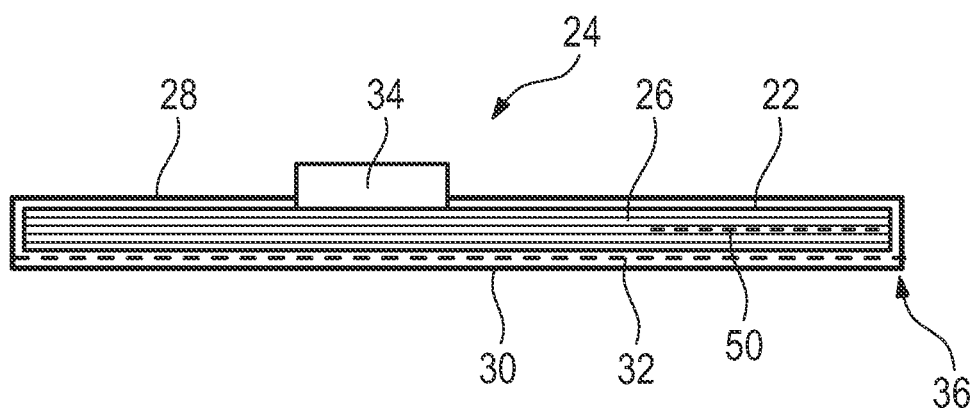
FIG. 2 shows a schematic view of the airbag unit according to the invention according to FIG. 1 in the stretched state in a side view.

In FIG. 1 a vehicle is shown comprising an A pillar 10, a B pillar 12 and a C pillar 14 as well as a roof frame 16, a side window 18 for the front occupant and a side window 20 for the rear occupant.

The two side windows 18, 20 are covered in the event of side impact by a curtain-like head side airbag 22 which in the deployed state is marked by broken lines at the outer edge as well as by hatching.

Prior to activation, the airbag 22 is accommodated being folded or rolled inside the vehicle beneath a side lining along the roof rail and, where necessary, also along the A pillar 10 and/or along the C pillar 14 or the D pillar.

The airbag 22 is part of an air bag unit 24 shown in FIGS. 2-5. The airbag unit 24 comprises the airbag 22 which, as is evident in FIG. 2, has exclusively longitudinal creases 26 extending in parallel to each other and over the entire length of the airbag 22. As an alternative to this, the airbag is rolled in the transverse direction so that the center axis thereof equally extends in the longitudinal direction, in other words, just as the creases 26.

The airbag unit moreover comprises a wrapping 28 that is preferably designed like a flexible tube and is made, for example, from a type of fabric material, textile material, a film or the like. The wrapping 28 holds the airbag 22 in its folded or rolled state, i.e. it holds the airbag in its package shape.

The wrapping 28 includes a first tearing line 32 shown in broken lines in the area of its lower edge 30 ("lower" refers to the mounted state of the airbag unit 24).

The tearing line 32 may be formed, for example, by a tear seam by which a strip-shaped material of the wrapping is joined by stitching after wrapping the package (folded airbag) or by a perforation.

Optionally the airbag unit 24 further includes an inflator 34 which is also evident from FIG. 1 and which is fastened, for example, in the area of the B pillar 12 on the roof rail 16.

Figure 3:
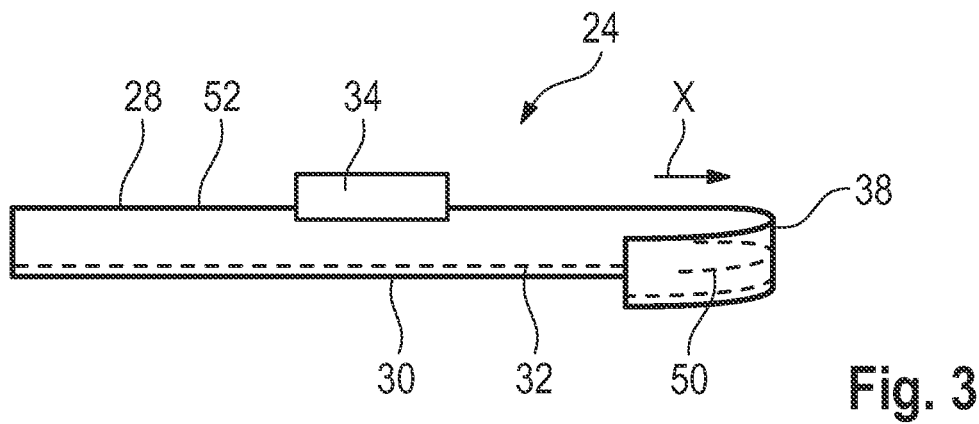
FIG. 3 shows the airbag unit according to FIG. 2 with a fold-back longitudinal end.
Figure 4:
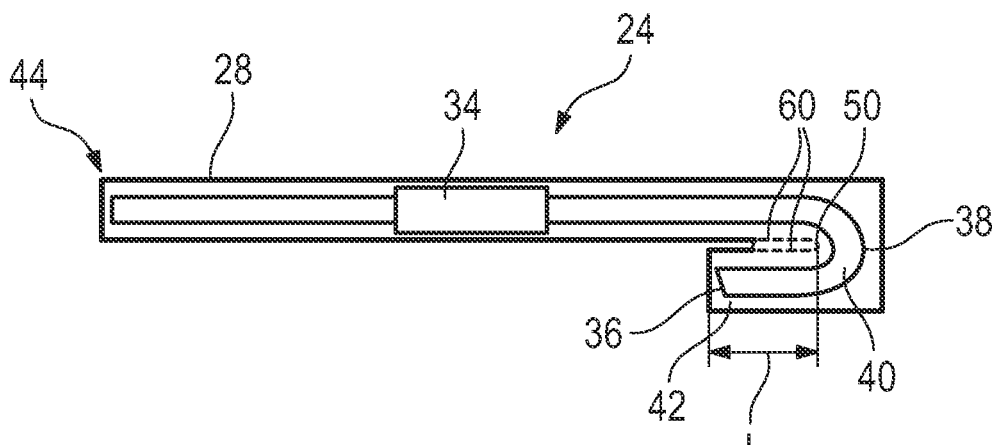
FIG. 4 shows the airbag unit according to the invention in accordance with FIG. 3 from above.

In the mounted state, the folded or rolled airbag 22, viz. the package formed in this way, is folded back in U-shape in the area of at least either of the longitudinal ends, in this case of the front longitudinal end 36, and is mounted in this state, as is evident from FIGS. 1, 3 and 4. In this way a bending point 38 is resulting.

Starting from the bending point 38, the so-called fold-back package portion 40 (cf. FIG. 4) extends to the longitudinal end 36 of the airbag, just as the fold-back portion 42 of the wrapping 28 surrounding the same. The portion of the airbag unit being composed of the portions 40 and 42 is referred to as the fold-back portion of the airbag unit. The portions that are not folded back are referred to as remaining wrapping, remaining airbag and remaining airbag unit.

Said remaining portions extend from the bending point 38 to the other longitudinal end 44 of the airbag unit.

The wrapping 28 includes, in the area ahead of and behind the bending point 38 and over the bending point 38, a provided second tearing line 50 which extends between an upper edge 52 and the lower edge 30 of the wrapping 28 (again related to the mounted state) preferably approximately in the middle with respect to the height.

The second tearing line 50 may be formed by a perforation of the wrapping 28 or a tear seam.

Moreover, the second tearing line 50 is spaced apart from the first tearing line 32 over its entire length, preferably it extends in parallel thereto and in the direction of longitudinal extension X of the package.

The tearing line is provided, related to the fold-back state of the airbag unit shown in FIG. 3, only on the inside of the "U" within the wrapping 28, i.e. on the wall portions 60 (see FIG. 4) of the wrapping 28 facing each other.

Considering FIGS. 3 and 4, it can be perceived that the second tearing line 50 extends, measured starting from the bending point 38, over the same length along the fold-back portion 42 as well as the remaining portion of the wrapping 28.

As a further option, the second tearing line may extend over at least 60%, especially over at least 75% of the length L of the fold-back portion 42 (measured from the inside of the bending point 38), i.e. not up to the longitudinal end 36 and the wrapping 28.

The second tearing line 50 is also less stable than the first tearing line 32 in the area of the second tearing line 50 so that when gas is applied inside the airbag 22, the second tearing line 50 breaks before the first tearing line 32.

In the mounted state, a fastener 62, e.g. a strip or a type of clamp, may fasten the fold-back portion of the airbag unit 24 to the remaining airbag unit or both jointly to the vehicle. Preferably said fastener 62 may equally be destroyed, when the airbag is filled with compressed gas.

By way of FIG. 4, incidentally it is also evident that the inflator 34 is fluid-coupled to the interior of the airbag at the central third of the longitudinal extension of the mountable airbag unit, i.e. in this area blows compressed gas into the airbag 22.

Hereinafter the functioning of the airbag unit shall be explained.

Figure 5:
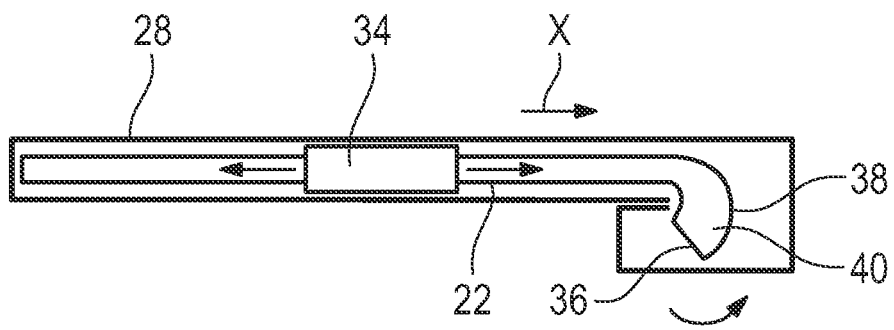
FIG. 5 shows the airbag unit according to the invention at the beginning of the deployment operation from above.

In a case of restraint, the inflator 34 is activated and injects compressed gas according to FIG. 5 in opposite longitudinal directions into the airbag 22, The gas presses the airbag apart so that longitudinally extending passages are formed via which primarily the further flow of compressed gas will take place. In parallel hereto, the airbag deploys transversely to the direction of longitudinal extension X and, where necessary, opens at least partially the wrapping 28 at the first tearing line 32. Gas flows therethrough also to the longitudinal end 36. Due to the widening of the airbag 22 transversely to the direction of longitudinal extension X, the airbag is shortened in said direction, which is shown in FIG. 5 by the longitudinal end 36 migrating forward. In the area of the bending point 38 the airbag 22 may quickly widen due to the rapidly breaking wrapping 38 which opens into said area along the second tearing line 50 prior to tearing of the tearing line 32. In this way, gas may easily flow into the fold-back package portion 40. The package portion 40 may quickly turn forward again in the arrow direction according to FIG. 5 and may deploy completely downwards.

It has to be emphasized that the fold-back airbag portion both may extend, in the side view in FIG. 1, below and above the remaining airbag package and may be folded back on the inside to the remaining airbag package, as this is shown in FIG. 4.

Of course, the airbag may be folded back at the front and/or rear longitudinal end, depending on the space available and on the geometry of the vehicle.

The invention claimed is:

1. An airbag unit comprising an airbag folded or rolled into an elongated airbag package, and a wrapping holding the package in the folded state, wherein one longitudinal end of the package including the surrounding flexible wrapping is folded back at a bending point forming a U-shape, the U-shape being formed by a folded-back portion of the airbag unit including a folded-back package portion and the wrapping surrounding the folded-back package portion, wherein the wrapping has a first tearing line which extends over the length of the airbag unit and via which the airbag leaves the wrapping during deployment, wherein the wrapping has a second tearing line in the area of the bending point, wherein the second tearing line extends at wall portions of the wrapping that face each other due to the U-shape.

2. The airbag unit according to claim 1, wherein the second tearing line extends in the direction of longitudinal extension of the package.

3. The airbag unit according to claim 1, wherein the second tearing line extends exclusively in the direction of longitudinal extension of the package.

4. The airbag unit according to claim 1, wherein the second tearing line is circumferentially spaced apart from the first tearing line over its entire length.

5. The airbag unit according to claim 1, wherein the second tearing line extends over at least 60% of the length of the folded-back portion of the wrapping.

6. The airbag unit according to claim 1, wherein the second tearing line extends from the bending point over the same length both along the folded-back portion of the wrapping and the remaining wrapping.

7. The airbag unit according to claim 1, wherein the second tearing line extends starting from the bending point only over a partial length of the folded-back portion of the wrapping.

8. The airbag unit according to claim 1, wherein an inflator is provided which is fluid-coupled to the airbag at the central third of the longitudinal extension of the folded airbag unit.

9. The airbag unit according to claim 1, wherein at least one fastener is provided by which the folded-back portion of the airbag unit is fixed relative to the remaining airbag unit.

10. The airbag unit according to claim 1, wherein the airbag is a curtain airbag for covering at least part of a side window of a dedicated vehicle.

11. The airbag unit according to claim 10, wherein the curtain airbag is configured to protect a front passenger and a rear passenger.

12. The airbag unit according to claim 1, wherein the wrapping is a flexible tube.

13. The airbag unit according to claim 1, wherein the first and/or second tearing line is a perforation of the wrapping or a tear seam.

14. The airbag unit according to claim 1, wherein the wrapping is configured at the second tearing line so that, when the airbag is filled with gas, it opens ahead of the portion of the first tearing line which extends next to the second tearing line.

15. The airbag unit according to claim 1, wherein the second tearing line extends over at least 75% of the length of the folded-back portion of the wrapping.

16. The airbag unit according to claim 1, wherein at least one fastener is provided by which the folded-back portion of the airbag unit is fastened to the airbag unit.

* * * * *